3,050,029
AUTOMATIC FISH FEEDER
Arthur I. Appleton, Northbrook, Ill. (% Appleton Electric Co., 1713 Wellington Ave., Chicago 13, Ill.)
Filed Nov. 12, 1959, Ser. No. 852,486
14 Claims. (Cl. 119—51.13)

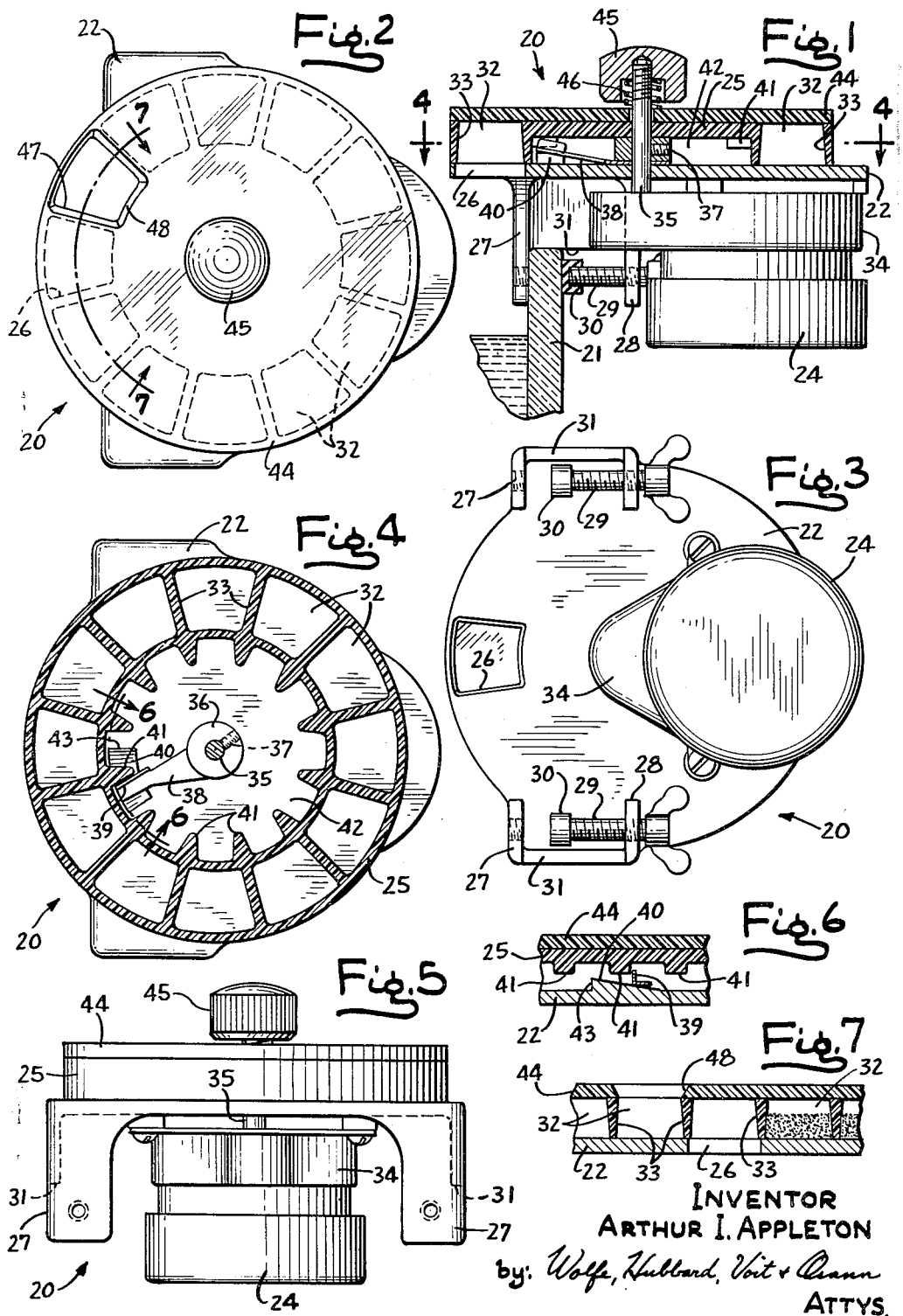

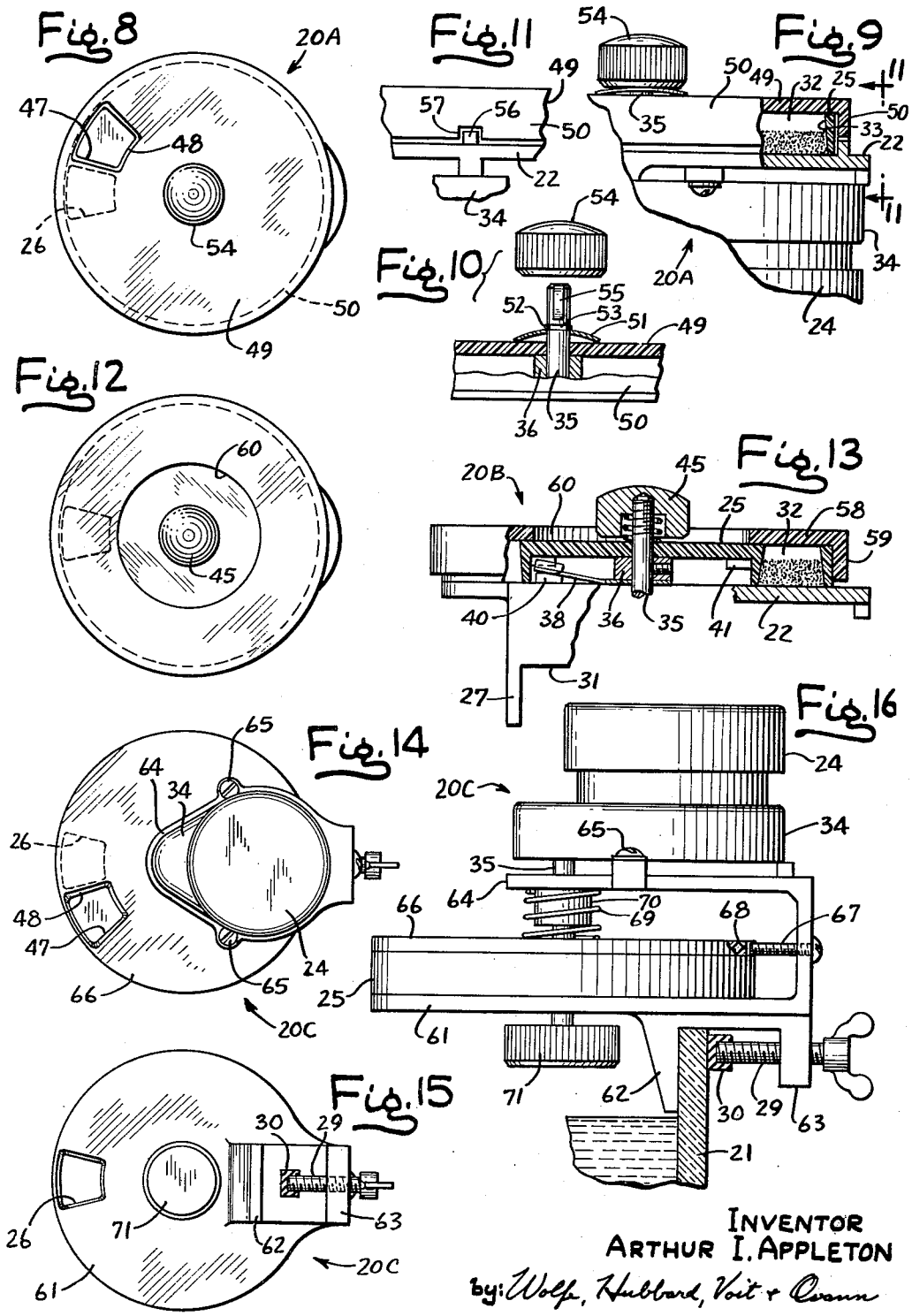

The present invention relates to automatic feeding devices and, more particularly, to a novel automatic feeder for fish or other pets and usable on aquariums, tanks, or other installations where fish or pets are confined.

The desirability of mechanizing the chore of feeding fish and other pets during the absence or vacation of the owner has long been recognized, both by the hobbyist and by the commercial operator. While it has received considerable attention heretofore, the results of such mechanization have not been particularly satisfactory for the great majority of users of such devices.

It is, accordingly, an object of the present invention to provide an automatic feeder for fish or other pets and which is adapted to dispense metered quantities of finely divided or granular food at precisely timed intervals, the dispensing operation being of a gradual yet positive nature.

Another object is to provide an automatic feeder of the type set forth and which will conveniently lend itself to the feeding of a carefully planned diet.

A further object of the invention is to provide an automatic feeding device of the foregoing type which will be of simple, compact construction and susceptible of easy loading.

Still another object is to provide an automatic feeder of the character set forth which will be inexpensive to manufacture yet reliable in operation and capable of being used, without alteration, on a wide variety of aquariums, tanks or other feeding locations.

Other objects and advantages will become apparent as the following description proceeds, taken together with the accompanying drawings, wherein:

FIGURE 1 is a view partly in a central vertical section and partly in elevation showing an illustrative automatic fish feeder embodying the present invention.

FIGS. 2 and 3 are, respectively, top and bottom plan views of the device of FIG. 1.

FIG. 4 is a horizontal sectional view of the device of FIG. 1, taken in the plane of the line 4—4.

FIG. 5 is an end elevation of the device of FIG. 1.

FIGS. 6 and 7 are enlarged fragmentary vertical sectional views taken, respectively, along the arcuate section 6—6 of FIG. 4 and the arcuate section 7—7 of FIG. 2.

FIG. 8 is a top plan view, on a reduced scale, of a modified form of feeder also embodying the invention.

FIGS. 9 and 10 are enlarged fragmentary vertical sectional views showing certain structural features of the modified feeder of FIG. 8.

FIG. 11 is an enlarged fragmentary elevational view of the modified device, taken as indicated by the plane 11—11 in FIG. 9.

FIG. 12 is a top plan view, on a reduced scale, of another modified form of feeder also embodying the invention.

FIG. 13 is an enlarged, fragmentary, elevational view of the feeder of FIG. 12.

FIGS. 14 and 15 are, respectively, top and bottom plan views, on a reduced scale, of still another modified form of feeder embodying the invention.

FIG. 16 is an enlarged elevational view of the modified form of feeder of FIGS. 14 and 15.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIGS. 1 to 5, inclusive, the invention is there exemplified in an automatic feeder 20 for fish or other pets and adapted for detachable mounting on a feeding location such as the side wall 21 of an aquarium or fish tank. The device comprises, in general, a support plate 22 carrying a timer 24 which drives a feed carrier 25 with an intermittent indexing motion. The feed carrier is adapted to discharge periodically metered quantities of finely divided or granular food through a discharge aperture 26 in the support plate situated in overlying relation with the water in the aquarium or tank.

The feeder 20 is held in operative position by means of bracket arms 27, 28 extending downwardly in pairs from the support plate 22. Each such pair of bracket arms 27, 28 is provided with an appropriate thumb screw 29 having at its inner end a resilient protective foot 30 for engaging the aquarium or tank wall 21 without damage. Between each pair of bracket arms 27, 28 there extends a web having a lower edge 31 which serves as a positioning abutment in cooperation with the top of the aquarium wall 21.

Provision is made in the feeder 20 for effecting a gradual yet positive discharge of feed through the use of a particularly compact structural arrangement. In furtherance of such objective, the feed carrier 25 is formed as a disk-like member with a plurality of feed pockets 32 disposed in circumferentially spaced relation along its outer peripheral region. Each such pocket 32 is, in this instance, designed to hold one day's supply of feed and the number of such pockets corresponds to the number of days in the operating cycle of the feeder. Each pocket 32 is formed with side walls 33 having a downward taper (FIGS. 1 and 7) so that the cross-sectional area of the pocket increases progressively in a downward direction. This insures positive emptying of feed out of the pocket 32 each time it is brought into registration with the discharge aperture 26.

For the purpose of driving the feed carrier 25 in properly timed relation with the feeding cycle desired, the timer 24 is provided with a speed reduction unit 34 having an output shaft 35 which, in this instance, rotates one revolution in 24 hours. Rigidly mounted on the shaft 35, as by means of a hub 36 and set screw 37, is a driving arm 38. Adjacent its projecting end, the arm 38 is provided with an upstanding driving abutment 39.

Provision is made for driving the feed carrier 25 with an intermittent indexing motion in a manner which insures a gradual yet positive discharge of feed from each successive pocket 32. This is accomplished by the use of a cam means adapted to deflect the arm 38 into periodic driving engagement with the carrier 25 for a time interval, in this case approximately two hours, of sufficient duration to effect a progressive discharge of feed from the pocket 32 as it moves toward a position of full registration with the discharge aperture 26. As will be noted upon closer reference to FIGS. 1, 3, 4, 6 and 7, such cam means in the present instance comprises a cam 40 fixed to the plate 22 in the rotational path of the arm 38. The cam 40 is adapted to cooperate with the arm 38 to deflect the latter axially of the shaft 35, the arm being made resilient in that direction for such purpose. Upon deflection by the cam 40, the outer end of the arm 38 is raised a sufficient distance to bring its driving abutment 39 into engagement with one of a series of teeth 41

(FIGS. 1, 4 and 6) situated around the upper peripheral portion of a relatively flat central chamber 42 in the feed carrier overlying the arm 38. The foregoing engagement continues for approximately a two hour period until the discharging pocket 32 has been brought into a position of full registry with the discharge aperture 26. At this point, the outer end portion of the arm 38 drops off of the abrupt end face 43 of the cam 40, such action snapping the abutment 39 out of engagement with the tooth 41 and leaving the arm 38 disengaged from the feed carrier until the arm has substantially completed another revolution.

The feed carrier 25 may be filled in at least two different ways, depending upon the preference of the user. One such way is simply to remove disk-shaped cover 44 which is centered on the shaft 35 in overlying abutting relation with the carrier 25. The cover 44 is, in this instance, detachably retained in place by means of knob 45 and biasing spring 46. Unscrewing of the knob 45 permits its removal, along with the spring 46 and cover 44, permitting feed to be poured directly into all of the pockets 32 of the carrier.

Alternatively, the pockets 32 may be filled without removal of the cover 44. This is accomplished by providing an overrunning clutch connection between the output shaft 35 and the timer 24, permitting the knob 45 and shaft 35 to be turned by hand in the proper direction (clockwise in this case) to engage the driving arm 38 with successive carrier teeth 41 and thereby index the carrier 25 manually. This action brings each pocket 32 successively under and into registry with filling aperture 47 in the cover 44. To facilitate filling, the exposed edge of the aperture 47 may be formed with a bevel 48 (FIG. 2).

It will be appreciated by those skilled in the art that, with either filling arrangement, the feeder 20 may be loaded with any desired combination of feeds. Its construction is, moreover, susceptible of such close regulation of the composition and amount of each day's feed that the feeding of a planned diet for the duration of the operating cycle is greatly facilitated.

Turning now to the device as illustrated in FIGS. 8, 9, 10 and 11, there is shown a modified feeder 20A also embodying the invention. Because of the close similarity between the feeders 20 and 20A, those parts common to both devices will be identified with the same reference numerals.

The feeder 20A has been designed to be relatively tamperproof, thus avoiding the possibility of having its operation interfered with by small children or other persons who may be so inclined. In furtherance of this objective, the device 20A is provided with a cover 49 of inverted pan shape. The cover 49 fits on the shaft 35 in overlying abutting relation with the feed carrier 25 and is provided with a depending skirt 50 which nestingly encloses the outer periphery of the carrier 25. It is also formed with a filling aperture 47 having a beveled edge 48 and similar to the coresponding filling aperture of the device 20 described earlier herein. The cover 49 is in this instance retained in place on the shaft 35 by means of a spring washer 51 and a small snap ring 52 which engages a groove 53 in the shaft 35 (FIG. 10).

To permit manual rotation of the carrier 25 for filling, the feeder 20A is provided with a knob 54. The latter is adapted to fit on the upstanding end portion of the timer output shaft 35 and is constrained against rotation relative thereto by reason of a flat 55 (FIG. 10) in the shaft, the knob 54 having a bore of complementary shape. Such arrangement permits the knob to be readily detached by the user, making it exceedingly difficult for anyone to rotate the shaft 35 and carrier 25 without special tools.

To preclude inadvertent rotation of the cover 49 when the feed carrier 25 is being operated manually by means of knob 54 for filling purposes, resort may be had to a simple yet effective holding means. In this instance, such means comprises an upstanding lug 56 fixed to the support plate 22 and which abuttingly engages the walls of an appropriate notch 57 in the lower edge of depending skirt 50.

Referring next to FIGS. 12 and 13, it will be noted that they illustrate another modified feeder 20B embodying the present invention. The feeder 20B is closely akin to the feeder 20 described earlier herein and thus common parts will be identified by like reference numerals. In this case, the feeder 20B is fitted with a cover 58 having a depending skirt 59 adapted to nestingly enclose the outer periphery of the carrier 25. The top of the cover is annular in shape and has no opening other than a large central aperture 60 overlying the central portion of the carrier 25. The cover 58 thus overlies completely the feed pockets 32 of the carrier, protecting them against the entry of dirt or foreign material, and the central aperture 60 permits the cover to be readily removed independently of the knob 45 for filling. In this instance, upon removal of the cover, the pockets 32 may all be filled without manually operating the carrier 25 to bring the pockets into registry with a filling aperture.

Referring more specifically to FIGS. 14, 15 and 16, another modification of the invention is there exemplified in the feeder 20C. The latter has many parts in common with the feeder 20 described above and these will be identified with like reference numerals.

As shown more clearly in FIG. 16, the feeder 20C may be detachably mounted on the aquarium or tank wall 21 by means of brackets 62, 63, thumb screw 29 and foot 30, the brackets depending from a support plate 61. Situated in vertically spaced, overlying relation with the support plate 61 and integral therewith is a mounting platform 64 having a shape and size corresponding substantially to that of the end face of the timer reduction unit 34. The timer 24 and the unit 34 are fixed as by means of screws 65 to the upper face of the platform 64 and so positioned that the timer output shaft 35 extends downwardly through the platform 64 and the support plate 61. This arrangement places the timer and reduction unit as far as possible from the aquarium, effectively protecting these elements against moisture condensation or splashing of water into their interior.

Journaled on the shaft 35 and resting on the upper surface of the support plate 61 is feed carrier 25 adapted to discharge feed through the discharge aperture 26 in the support plate. The carrier 25 is constructed and driven intermittently from the shaft 35 in the same manner as in the feeders described earlier herein. The carrier 25 in this case is surmounted by a flat disk-shaped cover 66, the latter being constrained against rotation by means of an anchor screw 67 and peripheral notch 68. The cover 66 is also formed with a filling aperture 47 and is yieldably pressed against the upper face of the carrier 25 as by means of a spring 69. The latter is positioned upon a fixed hub 70 depending from the bottom face of the platform 64 and surrounding the timer output shaft 35.

Manual operation of the carrier 25 for filling may be accomplished by means of the knob 71 fixed upon the lower depending end of the timer output shaft 35 beneath the support plate 61. Apart from the structural differences just described, the operation of the feeder 20C is basically similar to that of feeders 20, 20A, 20B.

I claim as my invention:

1. An automatic feeder for fish or other pets and comprising, in combination, a support plate having a feed discharge opening therethrough, means for detachably mounting said support plate on an aquarium or the like, a timer output shaft mounted on said support plate, a driving arm mounted on said timer shaft for timed rotation bodily therewith, a feed carrier rotatably mounted on said support plate, said carrier having a plurality of circumferential feed pockets therein adapted to register successively with said discharge opening, said feed carrier also having a central chamber therein enclosing said driving arm, a plurality of inwardly extending circumferentially spaced abutments corresponding to each feed pocket in said central chamber situated in spaced horizontal relation to said plate and said driving arm, a raised cam element fixed to said support plate in the path of said driving arm, said cam element deflecting said driving arm upward into engagement with one of said abutments for a predetermined and limited portion of each revolution of said timer output shaft.

2. An automatic feeder as set forth in claim 1, wherein said circumferentially spaced abutments are inclined radially inward toward the direction of movement of said feed carrier or flat area engagement by said driving arm.

3. An automatic feeder for fish or other pets and comprising the combination of a support plate having a feed discharge opening, means for mounting said support plate on an aquarium or the like, a timer output shaft mounted on said support plate, a driving arm mounted on said timer shaft for timed rotation bodily therewith, a feed carrier rotatably mounted on said support plate, said carrier having a plurality of circumferentially spaced feed pockets therein adapted to register successively with said discharge opening, each said pocket having a cross-sectional area increasing progressively toward said discharge opening, a raised cam element fixed to said support plate in projecting relation with the path of said driving arm, said cam element deflecting said driving arm into engagement with said feed carrier for a predetermined and limited portion of each revolution of said timer output shaft.

4. An automatic feeder for fish or other pets as defined in claim 3, and further comprising a timer mounted on said support plate remote from said discharge opening, and means for mounting said support plate on the wall of an aquarium or the like with said discharge opening on one side of the wall and said timer on the other side of the wall.

5. An automatic feeder for fish or other pets as defined in claim 3, and further comprising a timer mounted on said support plate in driving relation with said timer shaft, said feed carrier being journaled on said timer shaft, a cover mounted in overlying abutting relation with said feed carrier, a knob detachably secured to said timer shaft, and a resilient element interposed between said knob and said cover yieldably holding the same against said feed carrier.

6. An automatic feeder for fish or other pets and comprising, in combination, a support plate having a feed discharge opening, means for detachably mounting said support plate on an aquarium or the like, a timer output shaft mounted on said support plate, a driving arm mounted on said timer shaft for timed rotation bodily therewith, a feed carrier rotatably mounted on said support plate, said carrier having a plurality of circumferentially spaced feed pockets therein adapted to register successively with said discharge opening, each said pocket having a cross-sectional area increasing progressively toward said discharge opening, said feed carrier also having a central chamber therein enclosing said driving arm, a plurality of circumferentially spaced abutments in said central chamber situated in spaced relation to said driving arm, a cam element fixed to said support plate in the path of said driving arm, said cam element being adapted to deflect said driving arm into engagement with one of said abutments for a predetermined and limited portion of each revolution of said timer output shaft.

7. In an automatic feeder for fish or other pets, the combination comprising a support plate having a feed discharge opening therethrough, means for detachably mounting said support plate on an aquarium or the like, a timer shaft mounted on said support plate, a driving means on said timer shaft, a feed carrier rotatably mounted on said support plate, said carrier having a plurality of circumferentially spaced feed pockets therein adapted to register successively with said discharge opening, cam means intermittently and unidirectionally actuating said driving means into contact with said feed carrier for predetermined and spaced apart intervals of time, a cover disposed in overlying abutting relation with said feed carrier, said cover having a filling aperture therein, and means for manually bringing said feed pockets successively into registration with said filling aperture.

8. An automatic feeder for fish or other pets as defined in claim 7, and further comprising a timer mounted on said support plate in overlying relation with said cover and said feeder carrier.

9. An automatic feeder for fish or other pets as defined in claim 7, and further comprising means yieldably holding said cover against said feed carrier, and a timer mounted on said support plate in overlying relation with said cover and said carrier.

10. An automatic feeder for fish or other pets as defined in claim 7, and further comprising a timer, a mounting platform fixed to said support plate in overlying relation with said cover and said feed carrier, a resilient element interposed between said platform and said cover, and means precluding rotational movement of said cover relative to said feed carrier.

11. An automatic feeder for fish and other pets as defined in claim 7, wherein said cover is of annular form and disposed as a closure for the tops of said feed pockets, and further comprising a depending skirt on said cover disposed in telescoping relation with the other periphery of said feed carrier, and a timer mounted on said support plate.

12. An automatic feeder for fish or other pets as defined in claim 7, and further comprising a depending skirt on said cover disposed in nested relation with the outer periphery of said feed carrier, means for yieldably holding said cover against said feed carrier, a timer mounted on said support plate, and means precluding rotational movement of said cover relative to said feed carrier.

13. An automatic feeder for fish or other pets and comprising, in combination, a support plate, means for detachably mounting said support plate on an aquarium or the like, a timer mounted on said support plate, a timer output shaft driven unidirectionally by said timer, a driving arm mounted on said timer output shaft for rotation bodily therewith, said driving arm being resilient in a direction generally axially of said timer output shaft, a feed carrier journaled on said timer output shaft, said carrier having a plurality of feed pockets therein each with a cross-sectional area increasing progressively toward said discharge aperture, said feed carrier also having a central chamber therein enclosing said driving arm, a plurality of circumferentially spaced abutments in said central chamber situated in spaced relation to said driving arm, a cam element fixed to said support plate in the path of said driving arm, said cam element being adapted to deflect said driving arm into unidirectional engagement with one of said abutments for a predetermined and limited portion of each revolution of said timer output shaft, and a knob mounted on the end of said timer output shaft for adjusting the position of said feed carrier manually.

14. An automatic feeder for fish or other pets and comprising, in combination, a support plate having a feed discharge opening therethrough, means for detachably mounting said support plate on an aquarium or the like, a timer output shaft mounted on said support plate, a driving arm mounted on said timer shaft for timed rotation bodily therewith, a driving abutment on said driving arm, a feed carrier rotatably mounted on said support plate and enclosing said driving arm, said carrier having a plurality of circumferential feed pockets therein adapted to register successively with said discharge opening, a plurality of circumferentially spaced driven abutments in said carrier corresponding to each feed pocket and situated in spaced relation to said plate and to said driving arm, each said driven abutment having a portion complemental with a corresponding portion of said driving abutment for area contact thereby, a raised cam element fixed to said support plate in the path of said driving arm, said cam element being disposed to deflect said driving arm into engagement with one of said abutments for a predetermined and limited portion of each revolution of said timer output shaft.

References Cited in the file of this patent

UNITED STATES PATENTS

| | | |
|---|---|---|
| 1,944,381 | Wamhoff | Jan. 23, 1934 |
| 2,793,791 | Clark | May 28, 1957 |
| 2,865,447 | Kaufman | Dec. 23, 1958 |
| 2,901,150 | Matter | Aug. 25, 1959 |

FOREIGN PATENTS

| | | |
|---|---|---|
| 274,616 | Italy | May 27, 1930 |